(No Model.) 2 Sheets—Sheet 1.
L. E. KLUGH & J. HUDSON.
HITCHING DEVICE.
No. 278,710. Patented June 5, 1883.
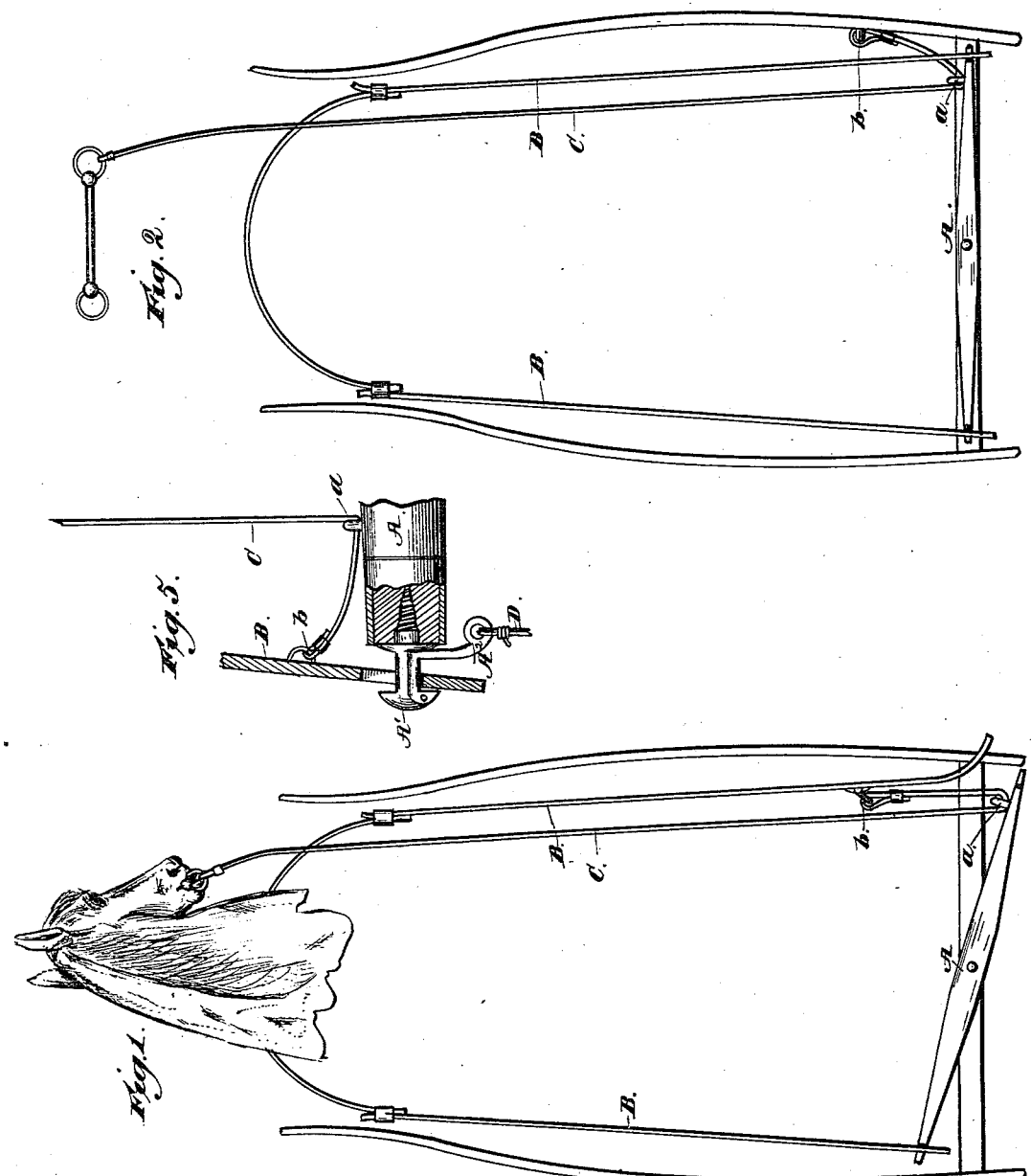
Witnesses:
Charles S. Hyer.
George W. Rea
Inventors:
Lewis E. Klugh & John Hudson
By W. W. Leggett
Atty (No Model.) 2 Sheets—Sheet 2.
L. E. KLUGH & J. HUDSON.
HITCHING DEVICE.
No. 278,710. Patented June 5, 1883.
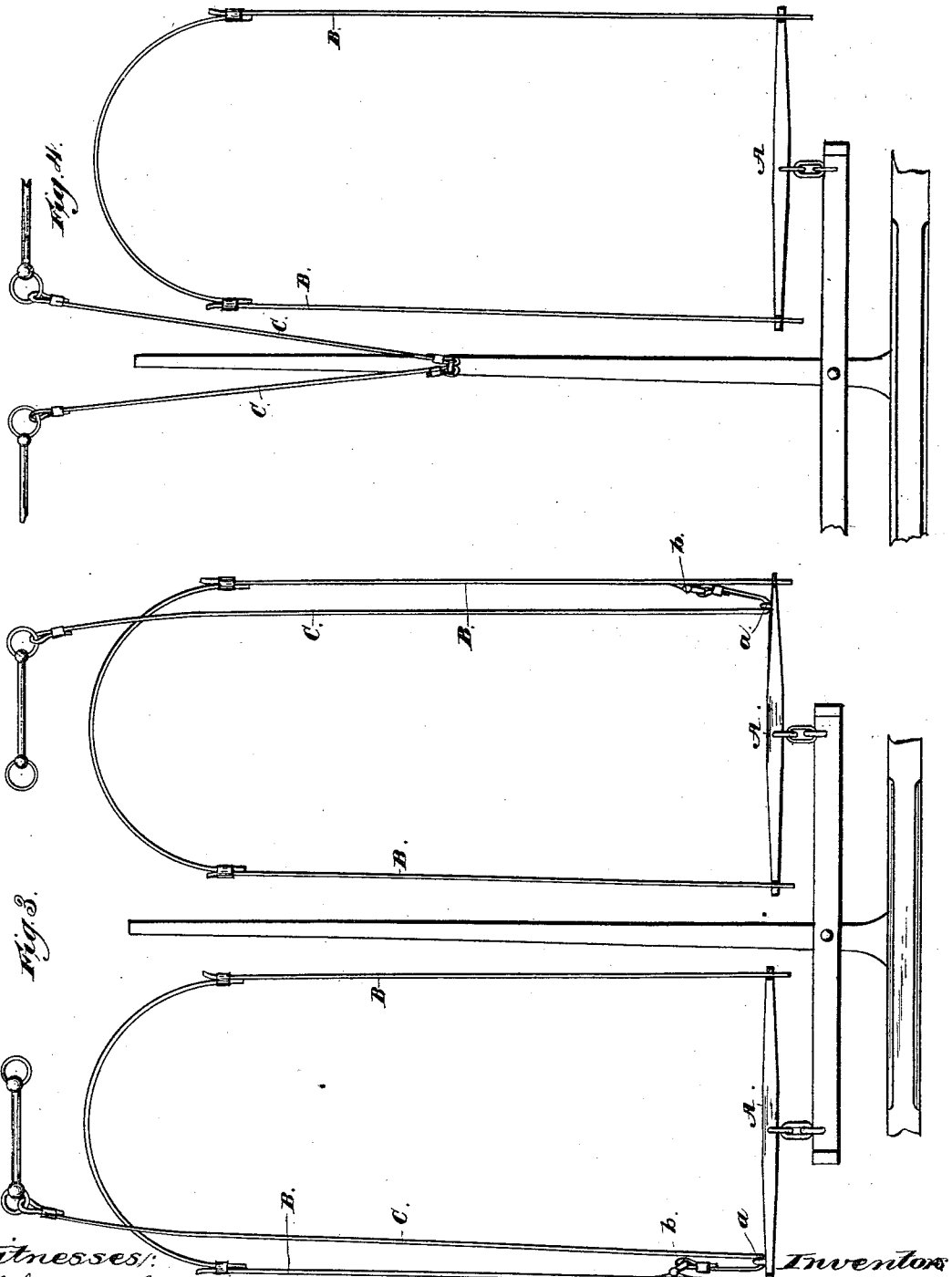

UNITED STATES PATENT OFFICE.

LEWIS E. KLUGH AND JOHN HUDSON, OF DETROIT, MICHIGAN.

HITCHING DEVICE.

SPECIFICATION forming part of Letters Patent No. 278,710, dated June 5, 1883.

Application filed February 17, 1883. (No model.)

*To all whom it may concern:*

Be it known that we, LEWIS E. KLUGH and JOHN HUDSON, of Detroit, county of Wayne, State of Michigan, have invented a new and useful Improvement in Hitching Devices; and we declare the following to be a full, clear, and exact description of the same, such as will enable others skilled in the art to which it pertains to make and use it, reference being had to the accompanying drawings, which form a part of this specification.

Our invention consists in the combination of devices and appliances hereinafter specified, and more particularly pointed out in the claims.

Figures 1 and 2 are plan views of our invention applied to single harness; Figs. 3 and 4, plan views showing the invention applied to double harness; and Fig. 5, a broken view showing a device for detaching the trace for use in connection with the invention.

The object of our invention is to provide a hitching device for horses, dispensing with the necessity of a hitching post or weight, and in which the animal shall be securely fastened by simply unfastening one of the traces. We accomplish this object as follows:

In the drawings, A represents a whiffletree.
B and B' are the traces.
C is a hitching-strap. The hitching-strap is attached, as usual, to the bit of the bridle and passed back through a suitable ring or pulley, *a*, secured on one end of the whiffletree, said strap being then secured in any proper manner to the trace, preferably at a little distance from the end of said trace.

It will be convenient to provide a hitching-strap with a snap at the rear end, and the trace with a suitable loop located at any desired place and riveted or otherwise properly secured thereto.

The operation of the device will now be understood, for it is evident that when the trace to which the hitching-strap has been thus secured is unfastened from the whiffletree any forward motion of the horse would cause the loose end of the whiffletree to go backward, and hence to draw backward with it the forward end of the hitching-strap, while the rear end of the strap is pulled forward by the trace to which it is attached. The stronger the horse presses forward the harder the end of the strap secured to the bridle is pulled back, and the horse is thereby checked. It has been found in practice that as the free end of the whiffletree goes backward one inch the forward end of the hitching-strap is drawn back four inches, or substantially in this proportion.

It is obvious that the hitching-strap may be connected to the trace at any desired point; or it may be secured to the shaft, as illustrated in Fig. 2, when by unfastening the trace the operation will be similar in effect.

As illustrated in Figs. 3 and 4, this hitching device is equally adapted for use in double harnesses, in which case each horse is provided with a hitching-strap engaged, as is already described, at the outer end of the whiffletree and to the trace, when by unfastening the outside traces the device will operate substantially as hereinbefore described, or in use with a span of horses the hitching-strap might be secured to the tongue instead of to the trace, if desired, without departing from the principle of my invention.

In the use of very light vehicles, should the animal be peculiarly hard-bitted or vicious, it might be necessary to lock one or more of the wheels by a strap, or by any suitable means, so that the vehicle should not be drawn by the animal's mouth. This would also prevent the backing of the animal. Should it be desired to secure the hitching-strap to the shaft or tongue, said shaft or tongue might be conveniently provided with a ring or staple, to which the end of the hitching-strap could be readily secured.

It will be seen that this device is peculiarly well adapted for use to effectually prevent the animal from running. To this end we prefer to provide a whiffletree with a tip so constructed that the trace may be easily disengaged therefrom. As illustrated in Fig. 5, the stationary tip A' may be constructed with a removing-arm, A², hinged or pivoted thereto at the outer end, said arm provided with a cord, D, secured at the inner end and passed back into the carriage, the construction being such that when the cord D is drawn by the driver the arm A² will force the trace off from said tip.

We would have it understood, however, that we do not limit ourselves to the disengagement of the trace from the whiffletree in precisely this manner, for it is evident that the strap D may be secured at its forward end to the loop, thence passed back through the ring $a$, thence back again through the loop $b$, when by pulling upon the strap D the end of the trace will be sufficiently slackened to be removed readily from the whiffletree-tip by hand. These or any other suitable means may be employed for disengaging the end of the trace from the whiffletree-tip. As soon as this disengagement has been effected the operation upon the hitching-strap will be the same as has been already described, and the animal will be quickly brought to a stand.

We are aware that it is not new to attach one end of a strap to a whiffletree and then pass such strap through a loop at the rear end of a check-rein and back to the vehicle, where it can be drawn tightly and secured in such manner that the end of the whiffletree to which the strap is secured is drawn forward to slacken the trace at that end and strain the trace at the other end, so that if the horse advances the strained trace will so draw on one end of the whiffletree as to pull the strap at the other end, and thus curb the horse. Such, therefore, we do not wish to be understood as covering by our claims.

What we claim is—

1. A device for fastening horses, composed of a hitching-strap connected at one end with a bridle-bit, and extending rearward therefrom loosely through a loop or ring attached to a whiffletree adjacent to one end thereof, the rear end of said strap being secured to the trace, or to the described equivalent thereof, substantially as and for the purpose set forth.

2. The combination of a hitching-strap adapted to connect at one end with the bridle-bit of a horse, and having its other end passed loosely through a loop or ring attached at one end of a whiffletree, and connected with the harness-trace, with a device, substantially as shown, for detaching the trace from the whiffletree, and an operating lug or strap connected with such device and adapted to extend into the vehicle, substantially as described.

3. A device for hitching horses, consisting in the combination, with the harness and whiffletree, of a strap secured at one end to the bridle and at the other end to the shaft or tongue, whereby the animal will be hitched by unfastening one of the traces, substantially as described.

In testimony whereof we sign this specification in the presence of two witnesses.

LEWIS E. KLUGH.
JOHN HUDSON.

Witnesses:
N. S. WRIGHT,
SAMUEL E. THOMAS.